(12) United States Patent
Lundberg et al.

(10) Patent No.: US 6,499,009 B1
(45) Date of Patent: Dec. 24, 2002

(54) HANDLING VARIABLE DELAY IN OBJECTIVE SPEECH QUALITY ASSESSMENT

(75) Inventors: Jonas Lundberg, Lulea (SE); Arne Steinarson, Lulea (SE); Anders Karlsson, Lulea (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/512,750

(22) Filed: Feb. 25, 2000

Related U.S. Application Data
(60) Provisional application No. 60/162,153, filed on Oct. 29, 1999.

(51) Int. Cl.[7] ............ G10L 21/02; H04J 3/06
(52) U.S. Cl. ............ 704/211; 704/228; 370/508; 370/519
(58) Field of Search ............ 704/200, 201, 704/211, 226, 228; 370/503, 504, 507, 516, 517, 519; 379/27.01, 27.03

(56) References Cited

U.S. PATENT DOCUMENTS

| | | | | |
|---|---|---|---|---|
| 5,682,384 A | * | 10/1997 | Zarros | 370/394 |
| 5,867,813 A | * | 2/1999 | Di Pietro et al. | 704/202 |
| 5,890,104 A | * | 3/1999 | Hollier | 704/201 |
| 5,912,701 A | * | 6/1999 | Morton, Jr. | 348/192 |
| 6,041,294 A | * | 3/2000 | Beerends | 702/195 |
| 6,259,677 B1 | * | 7/2001 | Jain | 370/252 |
| 6,349,286 B2 | * | 2/2002 | Shaffer et al. | 704/503 |

FOREIGN PATENT DOCUMENTS

| | | |
|---|---|---|
| EP | 0644674 A | 3/1995 |
| EP | 0946015 A | 9/1999 |

OTHER PUBLICATIONS

Tallak S. et al.: "Time Delay Estimation for Objective Quality Evaluation of Low Bit–Rate Coded Speech with Noisy Channel Conditions", Proceedings of the Asilomar Conference, IIII, 1993, pp 1216–1219.

Jeerage S. et al.: "Perceptually–Based Objective Quality Using Phoneme–Level Segmentation", Proceedings of the Vehicular Technology Conference, IEEE, vol. Conf. 44, 1994, pp. 1301–1305.

* cited by examiner

Primary Examiner—David D. Knepper
Assistant Examiner—Martin Lerner

(57) ABSTRACT

A speech quality estimation technique that employs an arbitrary, speech quality estimation algorithm. The speech quality estimation technique analyzes a reference speech signal and a test speech signal, and based on this analysis, identifies the level of continuous delay variation, if any, and the location of and size of any intermittent delay variations along the test signal. The reference speech signal and/or the test speech signal are adjusted to account for continuous delay variation and intermittent delay variations, such that the reference speech signal and the test signal are similarly scaled with respect to the time domain. The reference speech signal and the test speech signal are then compared for the purpose of generating a speech quality estimation. The resulting speech quality estimation is then adjusted based on the level of continuous delay variation and any intermittent delay variations.

26 Claims, 13 Drawing Sheets

HANDLING VARIABLE DELAY IN OBJECTIVE SPEECH QUALITY ASSESSMENT

This application claims the benefit of provisional application No. 60/162,153 filed Oct. 29, 1999.

FIELD OF INVENTION

The present invention relates to the field of telecommunications. More particularly, the present invention relates to estimating the quality of a speech signal.

BACKGROUND

In a conventional telecommunications system, the transmission chain over which a speech signal (e.g., a signal carrying a spoken sentence) must pass, may include speech encoders, speech decoders, an air interface, public switched telephone network (PSTN) links, computer network links, receive buffering, signal processing logic, and/or playback equipment. As one skilled in the art will readily appreciate, any one or more of these elements which make up the transmission chain may distort the speech signal. Estimating the quality of speech signals is important in order to ensure that speech quality exceeds minimum acceptable standards, so that speech signals can be heard and understood by a listener.

Typically, estimating speech quality involves transmitting a reference speech signal (herein referred to as a "reference signal") across a transmission chain to a receiving entity. The received signal, having been distorted by the various elements that make up the transmission chain, is herein referred to as the test signal. The test signal and the original reference signal are then forwarded to a speech quality estimation algorithm.

There are a number of conventional, speech quality estimation algorithms. Most, however, employ the same basic technique which is illustrated in FIG. 1. As shown, a reference signal 105 and a test signal 110 are divided into N number of short time frames (e.g., 20 msec. each). A new representation, such as a frequency representation, is then derived for each of the N time frames associated with the reference signal 105 and each of the N time frames associated with the test signal 110. A difference vector comprising N time frames is then derived by comparing the representations associated with each of the N time frames of the reference signal 105 with the corresponding representation associated with the test signal 110. The comparison might be accomplished by subtracting the corresponding representations on a frame-by-frame basis. For each frame, the difference between the corresponding representations may be summed so that a single distortion metric is derived for each of the N time frames. The N distortion metrics may then be averaged, where the average value can be used as a measure of total signal distortion or speech quality.

A problem with the above-identified speech quality estimation technique is that it is highly sensitive to time shifts (e.g., transmission delays); the greater the time shift, the more unreliable the speech quality estimation. In an attempt to avoid this problem, conventional speech quality estimation algorithms align the reference signal and the test signal before performing the speech quality estimation, as illustrated in FIG. 2. Of course, just as there are a number of conventional approaches for estimating speech quality, there are a number of conventional techniques for aligning a reference signal and a test signal.

One such technique for aligning a reference signal and a test signal utilizes a known, estimated "global" delay factor, as illustrated in FIG. 2. In accordance with this technique, the test signal or the reference signal is shifted in the time domain by an amount that is equivalent to an estimated global delay. Thereafter, the two signals may be fed to the speech quality estimation algorithm. Another well-known technique for aligning a reference signal and a test signal involves iteratively aligning the two signals in the time domain until a cross-correlation measurement, or other similar metric is maximized. Still another technique involves transmitting the reference signal, and in addition, information which identifies one or more portions of the signal, for example, by inserting sinusoidal signals or chirps into the reference signal. Accordingly, these one or more portions of the test signal can be more easily recognized and aligned with the corresponding portions of the reference signal.

Each of the above-identified techniques for aligning a reference signal and a test signal, however, assume that the delay introduced by the various components which make up the transmission chain is a fixed delay, or a delay that changes slowly over time, such that periodic resynchronization is possible. In other words, it is assumed that a constant time shift exists between the reference signal and the test signal. While this may hold true for circuit switched networks, transmission delays are rarely fixed or constant in packet switched networks, for example, Internet Protocol (IP) based networks. For instance, in virtually all packet switched network scenarios, transmission delays vary with traffic load (i.e., the level of congestion in the network). Since traffic load generally changes on a continuous basis, the transmission delay experienced by a single speech signal traversing the network may vary. If these variable transmission delays go undetected, the reference signal and the test signal cannot be properly aligned, and the speech quality estimation algorithm cannot possibly perform an accurate speech quality estimation. Furthermore, the use of inexpensive personal computer systems as communications devices might also contribute to a speech signal experiencing variable delays.

SUMMARY OF THE INVENTION

The present invention involves a speech quality estimation technique that permits the use of an arbitrary speech quality estimation algorithm. In general, the present invention analyzes the reference signal and the test signal, and based on this analysis, identifies delay variations and/or discontinuities in the test signal, if any. These portions of the test signal are then removed so that the reference signal and the test signal are similarly scaled with respect to time. The reference signal and the test signal are then forwarded to a standard speech quality estimation algorithm. The resulting speech quality estimation is then adjusted based on an analysis of the portions of the test signal that were previously removed.

Accordingly, it is an object of the present invention to provide a speech quality estimation technique that is capable of assessing speech quality despite the presence of variable transmission delays, including continuous and intermittent, variable transmission delays.

It is another object of the present invention to prevent the presence of variable transmission delays from precluding the use of a standard speech quality estimation algorithln.

In accordance with a first aspect of the present invention, the above-identified and other objectives are achieved by a method for estimating speech quality. The method involves identifying portions of a first speech signal that exhibit distortions caused by transmission delays. The identified portions are then removed from the first speech signal, and the first speech signal is compared to a second speech signal. A speech quality estimate is then generated, based on the comparison of the first speech signal and the second speech signal.

In accordance with a second aspect of the present invention, the above-identified and other objectives are achieved through a method of estimating speech quality in a telecommunications network, wherein a first speech signal is transported across a transmission chain to a receiving entity. The method involves aligning, at the receiving entity, each of a number of synchronization points along the first speech signal and a corresponding one of a number of synchronization points along a reference speech signal. A determination is then made as to whether any portions of the first speech signal reflect an intermittent delay variation, based on the alignment of the synchronization points along the first speech signal and the reference speech signal. The level of continuous delay variation exhibited by the first speech signal is then determined, and the first speech signal, or the reference speech signal, is adjusted to account for the level of continuous delay variation exhibited by the first speech signal, as well as for any portions of the first speech signal that reflect an intermittent delay variation. The first speech signal is then compared to the reference speech signal, and, based thereon, speech quality is estimated.

In accordance with a third aspect of the present invention, the above-identified and other objectives are achieved through a method of estimating speech quality in a packet switched telecommunications network, where speech signals are transported across a transmission chain to a receiving entity. The method involves aligning each of a number of sync point segments along a first speech signal with a corresponding sync pulse segment along a reference speech signal, where the first speech signal was transported across the transmission chain to the receiving entity, and where the reference signal is identical to the first speech signal prior to the first speech signal having been transported across the transmission chain. After aligning the sync point segments along the first speech signal and the sync pulse segments along the reference speech signal, an intermittent delay variation between adjacent sync point segments along the first speech signal, assuming one exists, is identified. Next, the location and size of any identified intermittent delay variation along the first speech signal is determined, as is any level of continuous delay variation exhibited by the first speech signal. The first speech signal or the reference speech signal is then adjusted to account for the presence of any intermittent delay variations and the level of continuous delay variation along the first speech signal. The first speech signal is then compared to the reference signal, and speech quality is estimated based on the comparison of the first speech signal and the reference signal. Finally, the estimated speech quality is adjusted to achieve a perceived speech quality, where the adjustment of the estimated speech quality is based on the intermittent delay variations, if any, and the level of continuous delay variation.

BRIEF DESCRIPTION OF THE FIGURES

The objectives and advantages of the present invention will be understood by reading the following detailed description in conjunction with the drawings, in which.

DETAILED DESCRIPTION OF THE INVENTION

The present invention involves a technique for estimating the quality of speech signals in a packet switched network (e.g., an IP based network). The present invention accomplishes this despite the presence of variable transmission delays which are common-place in packet switched networks. Moreover, the present invention is capable of employing an arbitrary speech-based algorithm to perform the speech quality estimation.

Figure 1:
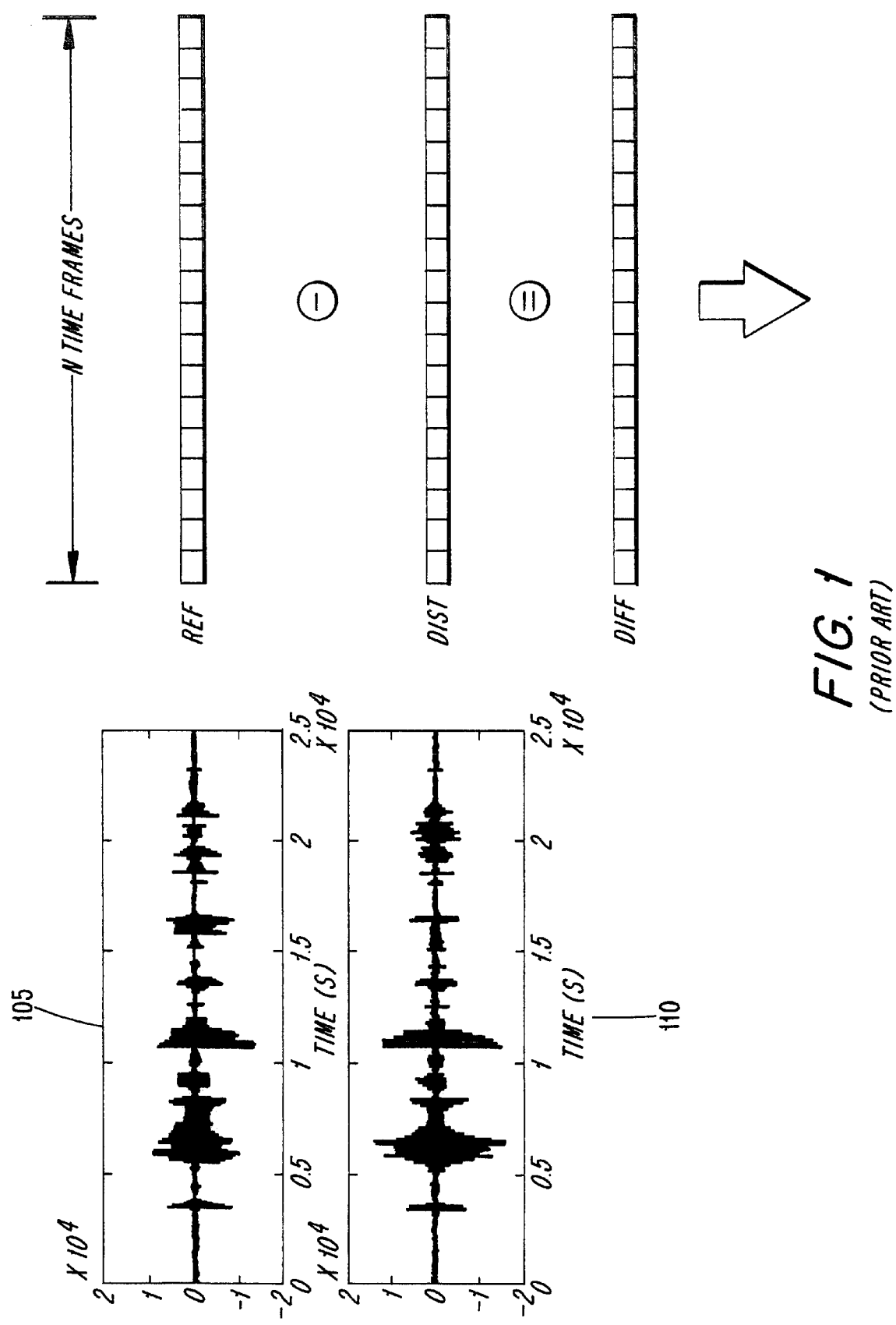
FIG. 1 illustrates the basic technique employed by conventional, speech quality estimation algorithms.
Figure 2:
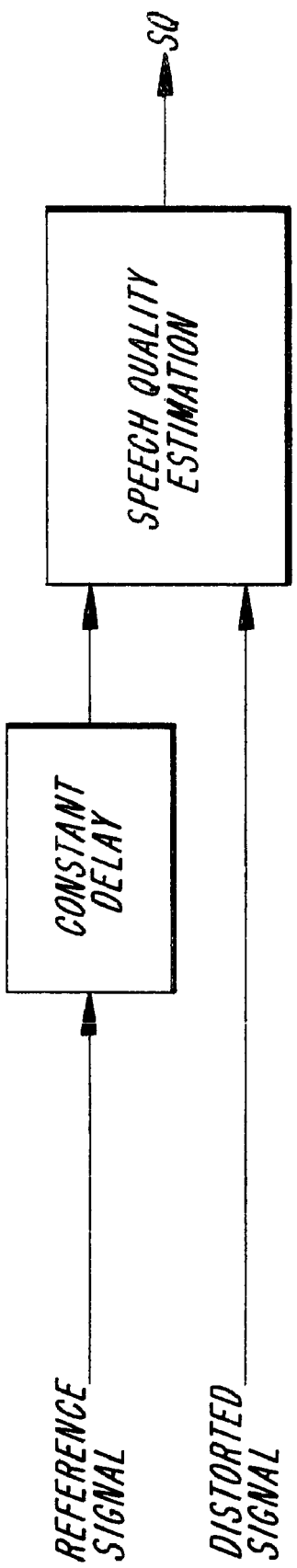
FIG. 2 illustrates a technique for aligning a reference signal and a test signal prior to performing speech quality estimation, in accordance with conventional speech quality estimation algorithms.
Figure 3:
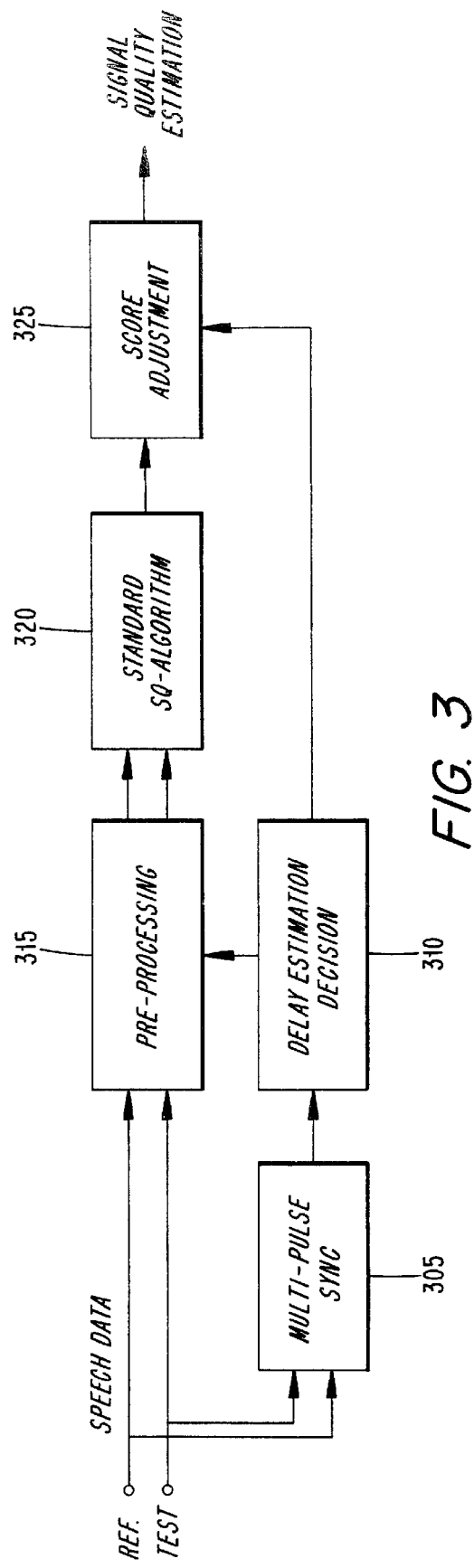
FIG. 3 provides an overview of the speech quality estimation technique in accordance with exemplary embodiments of the present invention.

FIG. 3 provides an overview of the speech quality estimation technique in accordance with exemplary embodiments of the present invention. As shown in FIG. 3, the reference signal and the test signal are forwarded to a multi-pulse synchronization algorithm 305. The multi-pulse synchronization algorithm 305, which is described in greater detail below, analyzes the reference signal and the test signal, and based thereon, identifies N number of sync pulses $Pr_1, Pr_2 \ldots Pr_{RN}$ along the reference signal and N number of sync positions $Pt_1, Pt_2 \ldots Pt_{tN}$ along the test signal, where each of the N number of sync positions $Pt_1, Pt_2 \ldots Pt_{tN}$ along the test signal is associated with a corresponding one of the sync pulses $Pr_1, Pr_2 \ldots Pr_{RN}$ along the reference signal. For each sync pulse, sync position pair, the multi-pulse synchronization algorithm 305 also generates a synchronization quality factor $q_1, q_2 \ldots q_N$, which provides an indication as to the quality of the synchronization between the corresponding sync pulse, sync position pair. Based on the synchronization information $\{(Pr_1, Pt_1,$ $q_1$); $(Pr_2, Pt_2, q_2) \ldots (Pr_N, Pt_N, q_N)\}$ generated by the multi-pulse synchronization algorithm 305, a delay estimation decision algorithm 310 identifies segments along the test signal that appear to have been influenced by variable transmission delays. A pre-processing algorithm 315 then adjusts the reference and/or test signals based on any identified transmission delays such that the reference signal and test signal are similarly scaled with respect to the time domain. The technique may then employ a standard speech quality estimation algorithm 320 to derive a speech quality estimate based on the adjusted reference and/or test signals. Finally, the signal quality estimate that is derived by the standard speech quality estimation algorithm 320 is, in turn, adjusted based on the nature of the segments that were identified by the delay estimation decision algorithm 310. As such, these segments of the test signal are taken into consideration in estimating overall speech quality, which ultimately results in a more accurate signal quality estimate. Each of the above-identified algorithms are described in greater detail herein below.

The multi synchronization algorithm 305 provides important information upon which the speech quality estimation is ultimately based. More specifically, the multi synchronization algorithm 305 aligns each of N segments, referred to herein as sync pulse segments, located along the reference signal, with a corresponding segment, referred to herein as a sync point segment, located along the test signal. The multi synchronization algorithm 305 accomplishes this despite the fact that portions of the test signal may contain more or less information than does the reference signal, due, in part, to intermittent and/or continuous, variable transmission delays.

Figure 4:
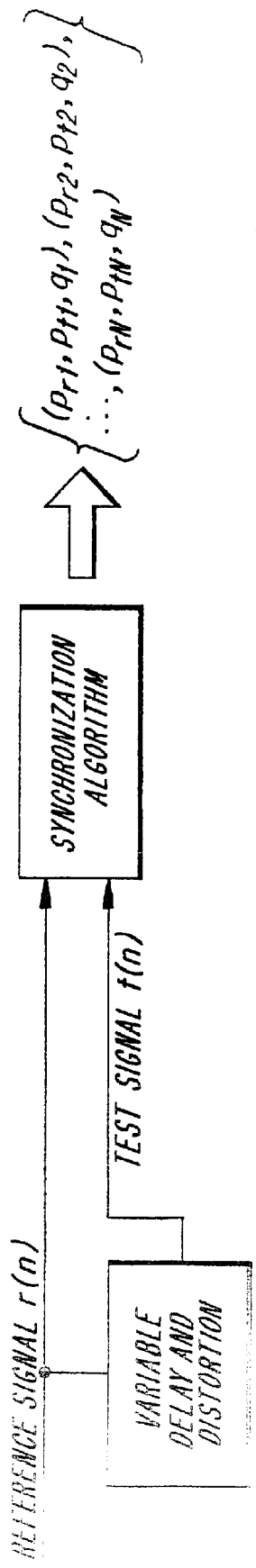
FIG. 4 provides an overview of an exemplary synchronization algorithm.

Any of a number of signal synchronization algorithms might be employed to provide the functionality of the multi synchronization algorithm 305. An exemplary synchronization algorithm, however, is described in co-pending U.S. patent application Ser. No. 09/430,246, which is incorporated herein by reference in its entirety. FIG. 4 provides an overview of this exemplary synchronization algorithm. As shown, the synchronization algorithm receives both a reference signal r(n) and a test: signal t(n), and therefrom, generates N number of triplet values $\{(Pr_1, Pt_1, q_1); (Pr_2, Pt_2, q_2) \ldots (Pr_N, Pt_N, q_N)\}$, where $Pr_1, Pr_2 \ldots Pr_N$ represent the N number of sync pulse segments identified along the reference signal r(n), $Pt_1, Pt_2 \ldots Pt_N$ represent the corresponding N number of sync point segments along the test signal t(n), and $q_1, q_2 \ldots qN$ represent the aforementioned speech quality factors associated with each sync pulse segment, sync point segment pair.

Figure 5:
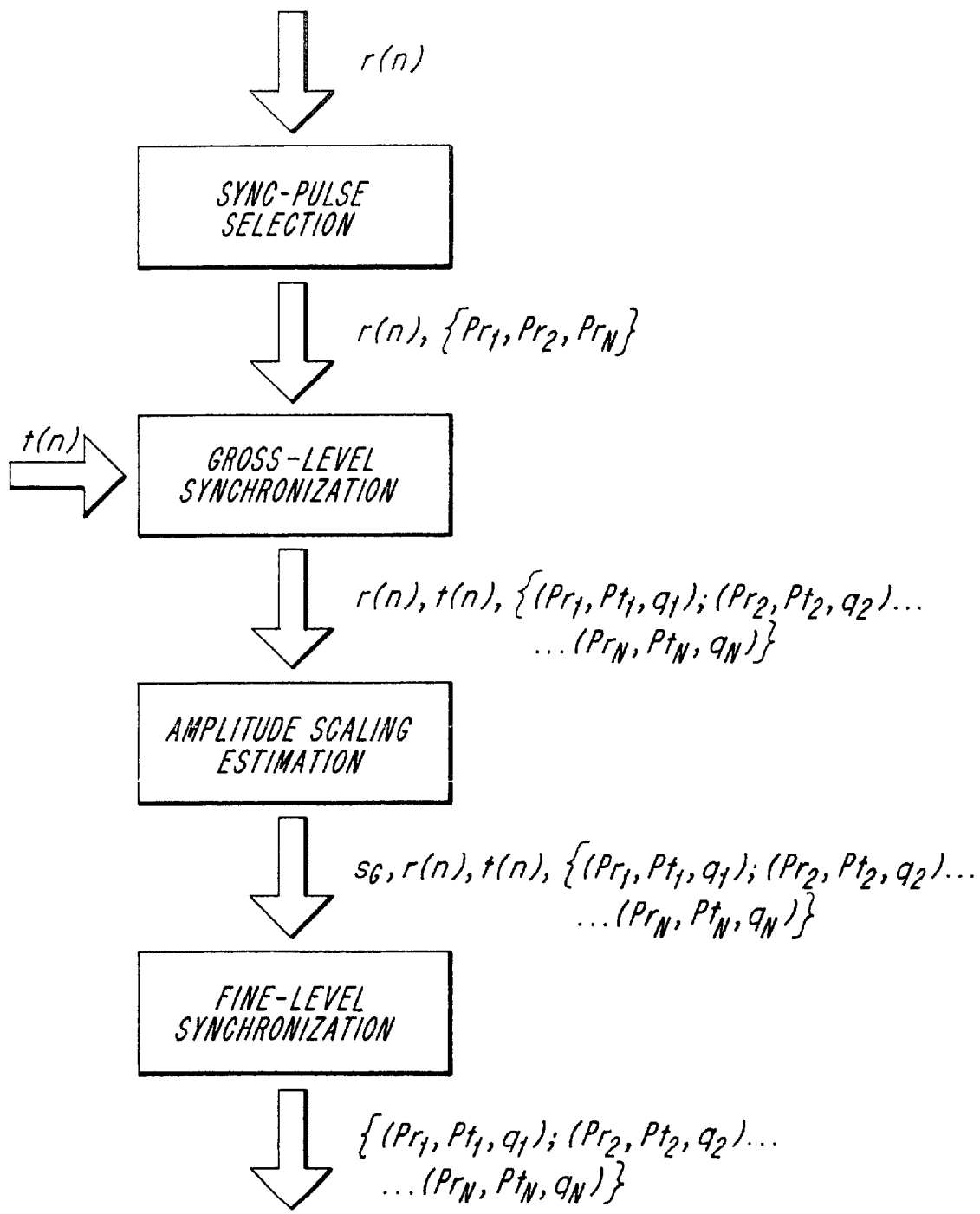
FIG. 5 is a flowchart depicting the basic steps associated with the aforementioned, exemplary synchronization algorithm.

FIG. 5 is a flowchart that depicts the four basic steps associated with the synchronization algorithm described in U.S. patent application Ser. No. 09/430,246. As indicated, the first step involves the selection of the N number of sync pulse segments $Pr_1, Pr_2 \ldots PrN$ along the reference signal r(n). During a second step, the synchronization algorithm performs a coarse or gross-level synchronization procedure, wherein N number of sync point segments $Pt_1, Pt_2 \ldots Pt_N$ along the test signal t(n) are idertified, a corresponding one for each of the N sync pulse segments $\{Pr_1, Pr_2 \ldots Pr_N\}$ along the reference signal r(n). During this second step, an interim synchronization quality factor $q_1, q_2 \ldots q_N$ is generated for each sync pulse segment, sync point segment pair. As such, the second step outputs N triplet values $\{(Pr_1, Pt_1, q_1); (Pr_2, Pt_2, q_2) \ldots (Pr_N, Pt_N, q_N)\}$, where each triplet value includes a sync pulse segment $Pr_i$, a corresponding, though approximate, sync point segment $Pt_i$, and an interim synchronization quality factor $q_i$. In a third step, an amplitude scaling estimate $S_G$ is generated. Then, in a fourth step, a fine-level synchronization is performed, where the fine-level synchronization procedure results in the generation of a second N number of triplet values $\{(Pr_1, Pt_1, q_1); (Pr_2, Pt_2, q_2) \ldots (Pr_N, Pt_N, q_N)\}$, where the sync point segments $Pt_1, Pt_2 \ldots Pt_N$ and the synchronization quality factors $q_1, q_2 \ldots q_N$ associated with each triplet value are defined with greater precision as compared to those defined in the triplet values generated by the second step described above.

As previously stated, the synchronization algorithm described in co-pending U.S. patenit application Ser. No. 09/430,246 is exemplary. One skilled in the art will readily appreciate the fact that other signal synchronization algorithms might be employed to provide the functionality of the multi synchronization algorithm 305.

Figure 6:
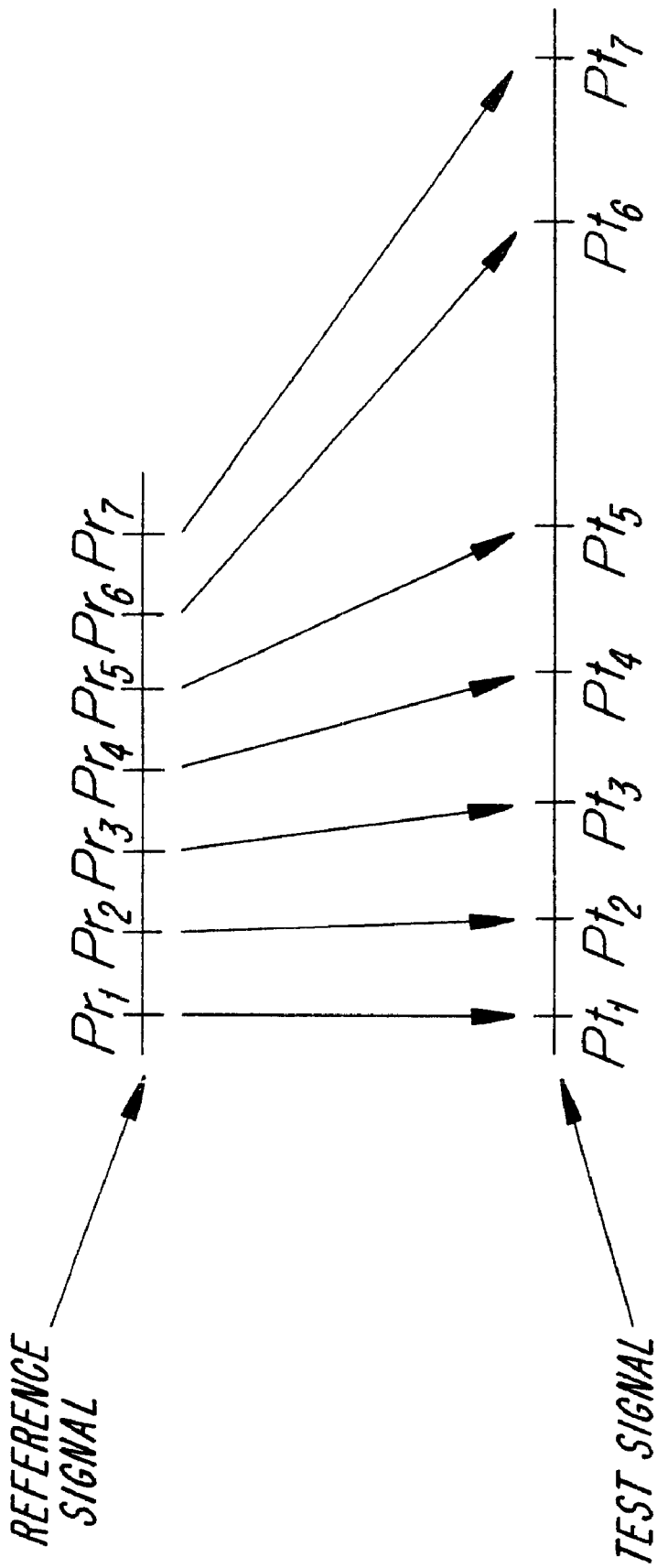
FIG. 6 illustrates a mapping between each of 7 exemplary sync pulse segments along a reference signal and a corresponding one of 7 sync point segments located along a test signal.

FIG. 6 shows; a mapping between each of 7 exemplary sync pulse segments $Pr_1, Pr_2 \ldots Pr_7$, located along a reference signal, and a corresponding one of 7 sync point segments $Pt_1, Pt_2 \ldots Pt_7$, located along a test signal, where the mapping is based on the information contained in 7 triplet values generated by the multi synchronization algorithm 305. In this instance, N is equal to seven. It is of importance to note that while the distances between adjacent sync pulse segments remain constant, or rnear constant, the distances between adjacent sync point segments are, in general, steadily increasing, with the exception of the distance between sync point segments $Pt_5$ and $Pt_6$. The steady increase in distance between adjacent sync point segments tends to indicate that the bit rate associated with the test signal might be greater than the bit rate of the reference signal, or that the data packets associated with the test signal were subjected to a steadily increasing transmission delay. In contrast, the distance between sync point segments $Pt_5$ and $Pt_6$ is significantly large, as compared to the distance between the other sync point segments along the test signal, thus indicating the presence of a signal discontinuity (i.e., intermittent delay). Accordingly, FIG. 6 illustrates how the information contained in the N triplet values generated by the multi synchronization algorithm 305 may be used for the purpose of detecting and identifying segments along the test signal that reflect continuous and intermittent, variable transmission delays.

Figure 7:
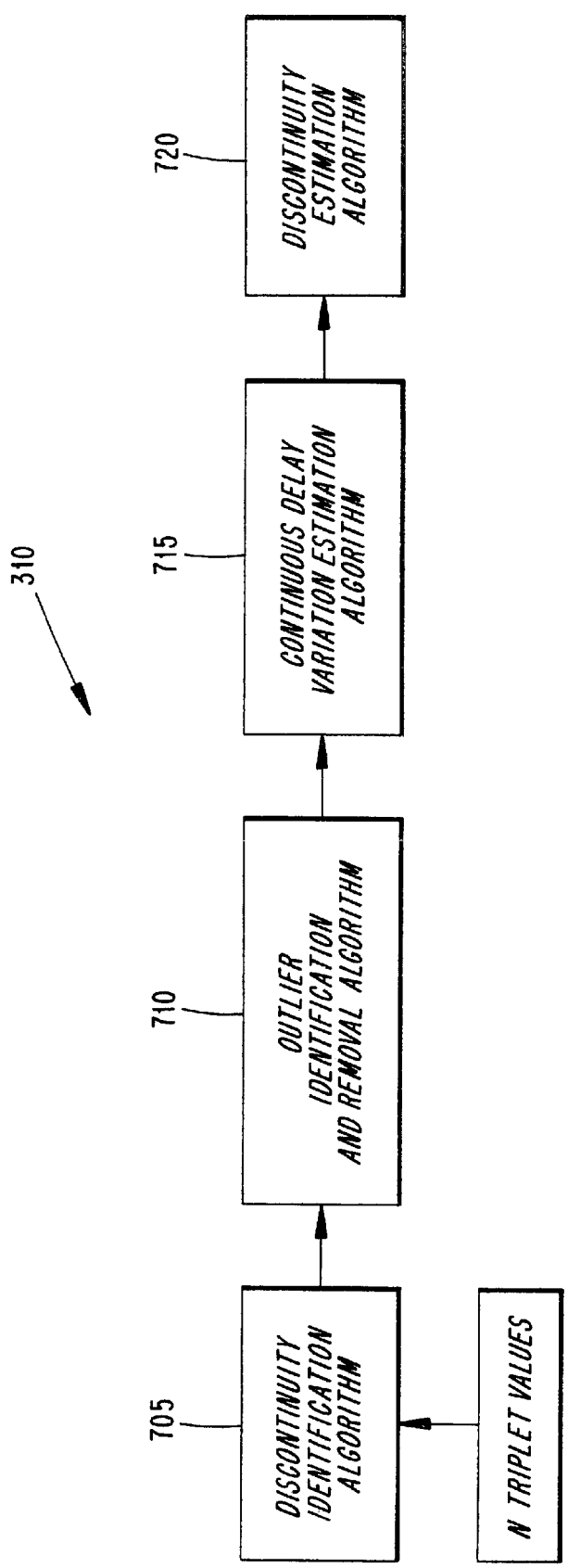
FIG. 7 illustrates the primary functional elements of the decision algorithm, in accordance with a preferred embodiment of the present invention.

As shown in FIG. 3, the N triplet values $\{(Pr_1, Pt_1, q_1); (Pr_2, Pt_2, q_2) \ldots (Pr_N, Pt_N, q_N)\}$ generated by the multi synchronization algorithm 305 are passed to a delay estimation decision algorithm 310, which is herein referred to as the decision algorithm. In general, the decision algorithm 310 analyzes the N triplet values and eliminates sync pulse, sync point segment pairs that do not appear to be accurately synchronized. In addition, the decision algorithm 310 classifies any distortion of the test signal as being related to, or reflective of, a continuous or intermittent variable delay. In accordance with a preferred embodiment of the present invention, the decision algorithm 310 comprises four primary functional elements, as illustrated in FIG. 7.

The first functional element associated with the decision algorithm 310 is a signal discontinuity identification algorithm 705. The signal discontinuity Identification algorithm 705 analyzes the distances between each pair of adjacent sync point segments along the test signal, and based on this analysis, determines whether the length of the test signal between any given pair of adjacent sync point segments is exceedingly large or small. A determination that a particular length of the test signal is exceedingly large or small tends to indicate that the corresponding portion of the test signal reflects a signal discontinuity (i.e., an intermittent delay). The signal discontinuity identification algorithm 705 may be implemented by comparing the length of the test signal between each pair of adjacent sync point segments to a threshold value, where the threshold value is, for example, a function of the mean or weighted mean distance between adjacent sync point segments.

Consider the following example to further illustrate a possible implementation of the discontinuity identification algorithm 705. In this example, N is equal to 20. Thus, there are 20 sync pulse segment, sync point segment pairs. First, a difference δ between the location of each sync point segment along the test signal and a corresponding sync pulse segment along the reference signal is determined. For example, the difference δ between the location of each of the 20 sync point segments and the corresponding sync pulse segment may be given in terms of a number of samples, as follows: $\delta_1$=5160, $\delta_2$=5187, $\delta_3$=5347, $\delta_4$=5347, $\delta_5$=5347, $\delta_6$=5347, $\delta_7$=5027, $\delta_8$=5027, $\delta_9$=5027, $\delta_{10}$=5027, $\delta_{11}$=5027, $\delta_{12}$=4867, $\delta_{13}$=4867, $\delta_{14}$=4867, $\delta_{15}$=4867, $\delta_{16}$=4867, $\delta_{17}$=4867, $\delta_{18}$=4867, $\delta_{19}$=4867, $\delta_{20}$=4867. Second, N−1 delta values Δ representing the change in the difference values δ are derived. If the N−1 delta values Δ are derived in accordance with the following relationship, $$\Delta_i = (\delta_{i+1}) - \delta_i \quad (1)$$

then the N−1 delta values Δ for the above-identified difference values δ would be given as follows: $\Delta_1$=27, $\Delta_2$=160, $\Delta_3$=0, $\Delta_4$=0, $\Delta_5$=0, $\Delta_6$=−320, $\Delta_7$=0, $\Delta_8$=0, $\Delta_9$=0, $\Delta_{10}$=0, $\Delta_{11}$=−160, $\Delta_{12}$=0, $\Delta_{13}$=0, $\Delta_{14}$=0, $\Delta_{15}$=0, $\Delta_{16}$=0, $\Delta_{17}$=0, $\Delta_{18}$=0, $\Delta_{19}$=0. Third, the N−1 delta values Δ are compared to a threshold value (e.g., ±40 samples), thus yielding the following: $\Delta_1 \to 0$, $\Delta_2 \to 1$, $\Delta_3 \to 0$, $\Delta_4 \to 0$, $\Delta_5 \to 0$, $\Delta_6 \to 1$, $\Delta_7 \to 0$, $\Delta_8 \to 0$, $\Delta_9 \to 0$, $\Delta_{10} \to 0$, $\Delta_{11} \to 0$, $\Delta_{12} \to 0$, $\Delta_{13} \to 0$, $\Delta_{14} \to 0$, $\Delta_{15} \to 0$, $\Delta_{16} \to 0$, $\Delta_{17} \to 0$, $\Delta_{18} \to 0$, $\Delta_{19} \to 0$, where a "1" indicates that the delta value Δ exceeded the threshold value and the presence of a possible signal discontinuity.

Any signal discontinuities identified by the signal discontinuity identification algorithm 705 are passed to the second functional element associated with decision algorithm 310. The second functional element, as indicated in FIG. 7, is the "outlier" identification and removal algorithm 710. The outlier identification and removal algorithm 710 determines whether any of the signal discontinuities identified by the signal discontinuity identification algorithm 705, as explained above, are true discontinuities or simply false alarms.

Figure 8:
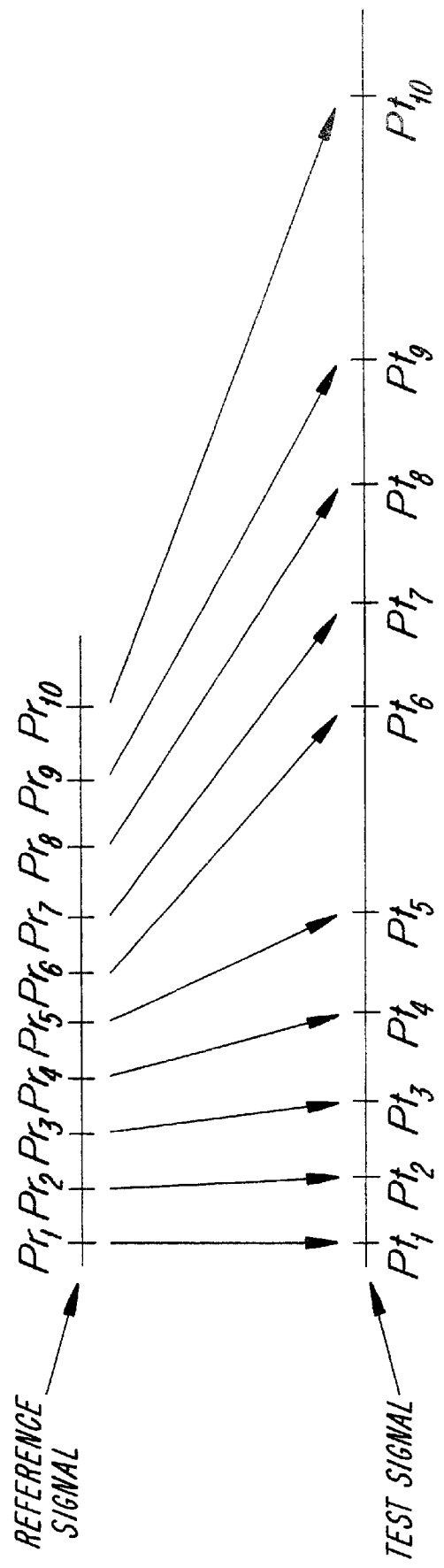
FIG. 8 illustrates a mapping between each of 10 sync pulse segments along a reference signal and each of 10 corresponding sync point segments along a test signal.

Consider the following example to better illustrate an exemplary embodiment of the outliner identification and removal algorithm 710. FIG. 8 shows a mapping between each of 10 sync pulse segments along a reference signal and each of a number of corresponding sync point segments along a test signal. The distance between the sync pulse segments are assumed to be constant, whereas the distance between the sync point segments increases linearly, but for the distances preceding sync point segment $Pt_6$ and sync point segment $Pt_{10}$. It is further assumed that the distances preceding sync point segment $Pt_6$ and sync point segment $Pt_{10}$ were identified as signal discontinuities by the signal discontinuity identification algorithm 705. First, the outlier identification and removal algorithm 710 identifies a "pulse set" associated with the distance along the test signal to be evaluate(d. If, for instance, the distance along the test signal being evaluated is the distance preceding sync point segment $Pt_6$, the pulse set might comprise sync point segments $Pt_6$, $Pt_7$, $Pt_8$ and $Pt_9$. It will be understood, however, that an investigation as to whether a signal discontinuity is likely to exist must include pulse segments, some of which may precede and some of which may follow the distance to be evaluated. If all pulse segments, from the beginning until the first frame slip, are evaluated separately, one skilled in the art will appreciate that it is enough to evaluate pulses that follow the signal discontinuity in order to decide whether a discontinuity probably exists. Nevertheless, once the outlier identification and removal algorithm 710 identifies the pulse set, the pulses which make up the pulse set are analyzed to determine whether any of a number of conditions are fulfilled. For example, one condition might be whether at least one synchronization (quality factor $q_i$, associated with any one of the sync point segments which make up the pulse set, is greater than a first minimum synchronization quality threshold. The fulfillment of such a condition would indicate that the length of the corresponding distance is reliable. A second condition might be whether at least two synchronization quality factors, associated with any two of the sync point segments which make up the pulse set, are greater than a second minimum synchronization quality threshold, where the second minimum synchronization quality threshold is understood to be less than the first minimum synchronization quality threshold, and whether the number of sync point segments which makes up the pulse set is greater than a minimum number of sync point segments. Yet a third condition might be whether at least one synchronization quality factor, associated with any one of the sync point segments which make up the pulse set, is greater than a third minimum synchronization quality factor threshold, and whether the number of sync point segments which make up the pulse set is greater than the aforementioned minimum number of sync point segments, where the third minimum synchronization quality threshold is understood to be less than the first minimum sync quality threshold, but greater than the second minimum sync quality threshold. Then, if any one of the conditions are fulfilled, the outlier identification and removal algorithm 710 makes the determination that the length of the test signal being evaluated is reflective of a true signal discontinuity (i.e., an intermittent delay).

If the outlier identification and removal algorithm 710 determines that a length of the test signal is reflective of a true signal discontinuity, for example, the length of the test signal preceding $Pt_6$ in FIG. 8, the corresponding sync point segment $Pt_6$ is identified as an "outlier". The outlier identification and removal algorithm 710 then removes all of the sync point segments that have been identified as "outliers" (i.e., false signal discontinuities) from amongst the N number of sync point segments $Pt_1$, $Pt_2$ . . . $Pt_N$ that were identified by the multi pulse synchronizatior algorithm 305. The remaining M number of sync point segments $Pt_1$, $Pt_2$ . . . $Pt_M$ are preserved and passed to the third functional element of the Decision algorithm 310, where it will be understood that M is defined by the following relationship:

$$M = N - O - TD - Q_x \quad (2)$$

where the variable O represents the number of sync point segments identified as "outliers" by the outlier identification and removal algorithm 710; TD represents the number of "true" discontinuities; and $Q_x$ represents the number of sync pulses having a low sync quality.

The third functional element associated with the Decision algorithm 310 is the continuous delay variation estimation algorithm 715. The continuous delay variation estimation algorithm 715 estimates the level or degree of continuous delay variation Δf exhibited by the remaining M number of sync point segments $Pt_1$, $Pt_2$ . . . $Pt_M$, along the test signal, as compared with the location of the corresponding sync pulse segments $Pr_1$, $Pr_2$ . . . $Pr_M$, along the reference signal. In general, the level of continuous delay variation Δf is a function of the sync point segment frequency $f_t$ (i.e., the frequency of the sync point segments along the test signal) and the sync pulse segment frequency $f_r$ (i.e., the frequency of the sync pulse segments along the reference signal). In accordance with a preferred embodiment of the present invention, the level of continuous delay variation $\Delta f$ is defined by the following relationship:

$$\Delta f = (f_t {}^* f_r{}^{-1}) - 1 \qquad (3)$$

where a level of continuous delay variation $\Delta f$ equal to zero (0) indicates that there is no continuous delay variation, which occurs when the sync pulse segment frequency $f_r$ and the sync point segment frequency $f_t$ are equal in value, as one skilled in the art will readily appreciate.

Figure 9:
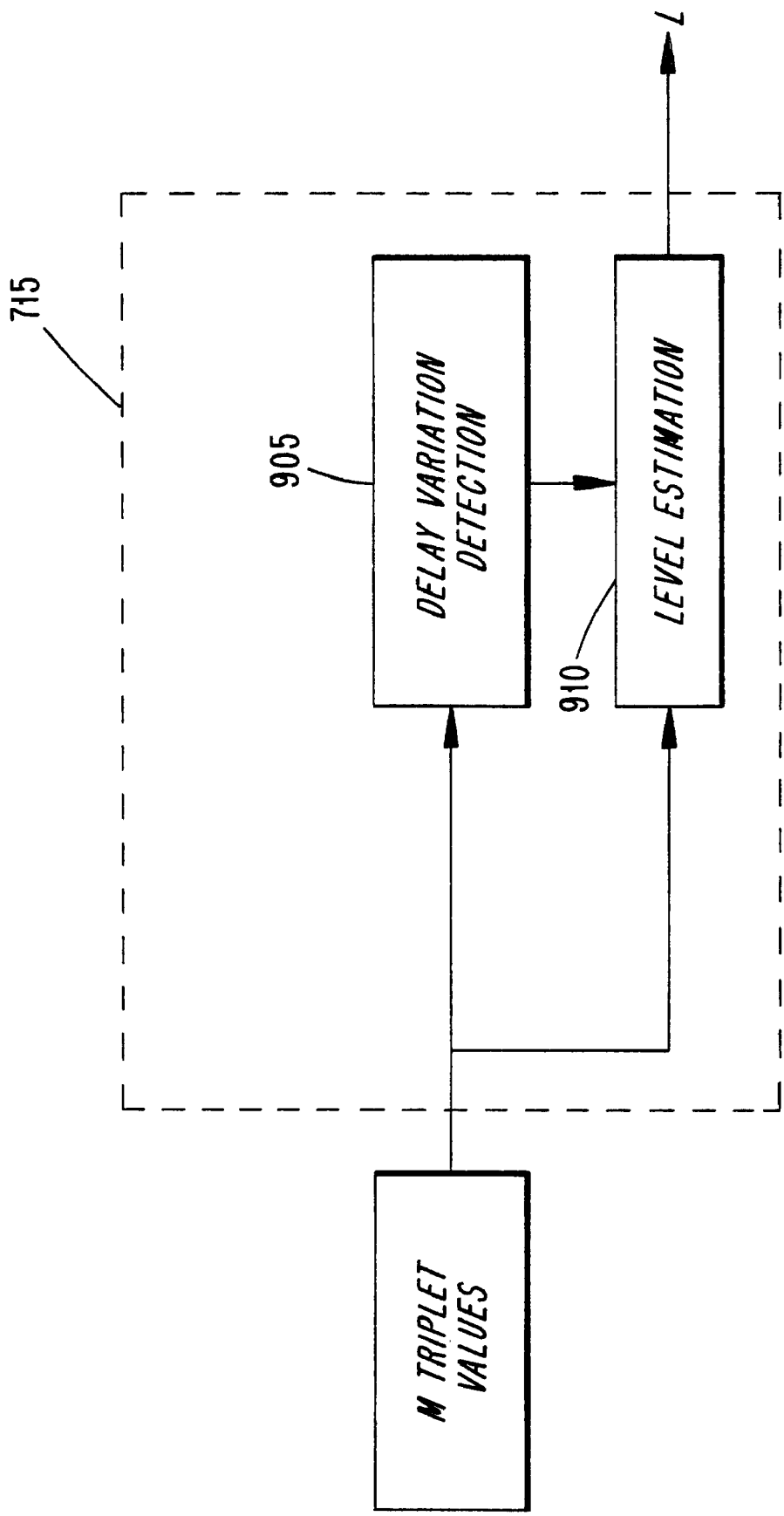
FIG. 9 illustrates the continuous delay variation estimating algorithm, in accordance with an exemplary embodiment of the present invention.

The continuous delay variation estimating algorithm 715 is now described in greater detail. FIG. 9 illustrates an exemplary embodiment for implementing the continuous delay variation estimating algorithm 715. As shown, the continuous delay variation estimating algorithm 715 is divided into two functional components: a delay variation detection algorithm 905 and a level of delay variation estimation algorithm 910. In general, the delay variation detection algorithm 905 analyzes the location of the M sync point segments $Pt_1, Pt_2 \ldots Pt_M$ along the test signal, as compared to the location of the corresponding sync pulse segments $Pr_1, Pr_2 \ldots Pr_M$ along the reference signal, and therefrom, determines whether it is more likely than not that the location of the M sync point segments $Pt_1, Pt_2 \ldots Pt_M$ along the test signal reflect a continuous delay variation. In contrast, the delay variation estimation algorithm 910 estimates the continuous delay variation, if any, and in addition, uses the determination made by the delay variation detection algorithm 905 to set a "fitness" threshold, where the fitness threshold serves as criteria in determining whether to accept or reject the continuous delay variation estimate. Both the delay variation detection algorithm 905 and the delay variation estimation algorithm 910 are described in greater detail herein below.

As stated, th(e delay variation detection algorithm 905 determines whether a delay variation is likely to exist given the location of the M sync point segments $Pt_1, Pt_2 \ldots Pt_M$ along the test signal. In accordance with a preferred embodiment of the present invention, the delay variation detection algorithm 905 makes this determination based on a total sync point segment position error E and a variance V. The total sync point segment position error E may, for example, be derived using the following equation:

$$E = \sum_{i=1}^{M-1} [P_{(derivate)i} - \Delta f_{est}] \qquad (4)$$

where $P_{(derivate)i}$ is a delta function that is based on the distance between two adjacent sync point segments along the test signal and the distance between two corresponding sync pulse segments along the reference signal. For instance, if "i" is equal to "1", $P_{(derivate)i}$ might be defined as follows.

$$P_{(derivate)i} = ((Pt_2 - Pt_1) - (Pr_2 - Pr_1))^*(Pr_2 - Pr_1)^{-1} \qquad (5)$$

In contrast, $\Delta f_{est}$ could, for instance, be the weighted median value of the delta function $P_{derivate}$. Another method could involve iterating through a range of different $\Delta f_{est}$ values and choosing the one value that minimizes the sum E.

The variable V represents the variance of the weighted median $\Delta f_{est}$. More specifically, the variable V is a function of the weighted median value $\Delta f_{est}$ and the delta function $P_{(derivate)i}$ value immediately less than the weighted median value and the delta function $P_{(derivate)i}$ value immediately greater than the weighted median value. The variable V can thus be defined in accordance with the following relationship:

$$V = \text{variance}(W_{median-1}, W_{median}, W_{median+1}) \qquad (6)$$

where $W_{median}$ is equivalent to the weighted median value of $P_{derivate}$, $W_{median-1}$ is equivalent to the $P_{derivate}$ that is just less than $W_{medium}$, and $W_{median+1}$ is equivalent to the $P_{deri\text{-}vate}$ that is just greater than $W_{medium}$.

After the delay variation detection algorithm 905 derives the total sync point position error E, and the variance V, as described above, the delay variation detection algorithm 905 compares the total sync point position error E to a total sync point position error threshold $T_E$. It also compares the variance V to a variance threshold $T_V$. One skilled in the art will readily,appreciate that the actual value of the total sync point position error threshold $T_E$ and the actual value of the variance threshold $T_V$ may be empirically derived. By comparing the total sync point position error E to the total sync point position error threshold $T_E$, and by comparing the variance V to the variance threshold $T_V$, the delay variation detection algorithm 905 is able to determine whether the total sync point position error E and/or the variance V are relatively small. If the delay variation detection algorithm 905 determines that both the total sync point position error E and the variance V are relatively small (i.e., E is less than $T_E$ and V is less than $T_V$), the delay variation detection algorithm 905 sets a detection flag equal to a "TRUE" state, which indicates, in turn, that a continuous delay variation is likely to exist, given the location cf the M sync point segments $Pt_1, Pt_2 \ldots Pt_M$ along the test signal.

As previously stated, the delay variation estimation algorithm 910 estimates the continuous delay variation $\Delta f$. In general, the delay variation estimation algorithm 910 accomplishes this by calculating a predicted location for the M sync point segments $Pt_{1(pred)}, Pt_{2(pred)} \ldots Pt_{M(pred)}$ along the test signal for each of a number of sync point segment frequencies. Then, for each sync point segment frequency, the delay variation estimation algorithm 910 compares the distances between adjacent, predicted sync point segments $Pt_{1(pred)}, Pt_{2(pred)} \ldots Pt_{M(pred)}$ to the distances between the actual location of the sync point segments $Pt_1, Pt_2 \ldots Pt_M$, as derived by the multi pulse synchronization algorithm 305. A "fitness" value $D_{fitness}$ is then generated based on this comparison. A maximum fitness value $D_{fitness(max)}$ is eventually derived and compared to a first fitness threshold or a second fitness threshold, depending upon whether the detection flag was set equal to its "TRUE" state by the delay variation detection algorithm 905, as explained above. If the delay variation estimation algorithm 910 determines that the maximum fitness value $D_{fitness(max)}$ is greater than the fitness threshold to which it is compared, the delay variation estimation algorithm 910 sets the continuous delay estimate $\Delta f$ equal to a value in accordance with equation (3) above, where $f_t$ is the sync point segment frequency that corresponds with the maximum fitness value $D_{fitness(max)}$, and where $f_r$ is the sync point segment frequency. If, however, the delay variation estimation algorithm 910 determines that the maximum fitness value $D_{fitness(max)}$ is less than or equal to the fitness threshold, the delay variation estimation algorithm 910 sets the continuous delay estimate $\Delta f$ equal to zero (0), which indicates that a continuous delay variation is not exhibited by the sync point segments along the test signal.

Figure 10:
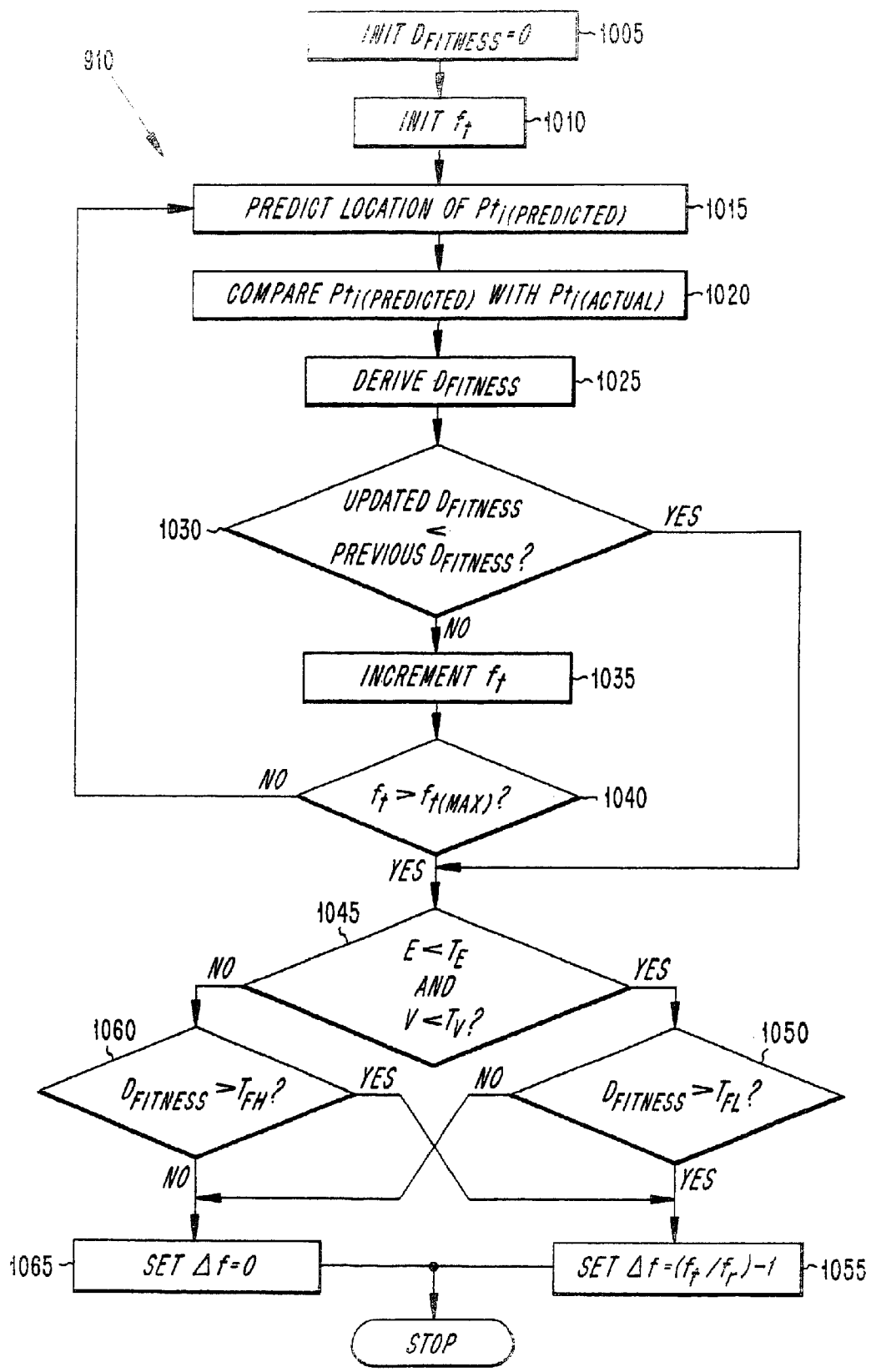
FIG. 10 illustrates a technique for implementing the delay variation estimation algorithm, in accordance with an exemplary embodiment of the present invention.

FIG. 10 illustrates, in more detail, a technique for implementing the delay variation estimation algorithm 910, in accordance with an exemplary embodiment of the present invention. As shown in block 1005, the technique begins with the initialization of the fitness value $D_{fitness}$ to zero (0). As stated above, a fitness value $D_{fitness}$ is derived for each sync point segment frequency, and the maximum fitness value $D_{fitness(max)}$ is used to identify the one sync point segment frequency that most accurately reflects the frequency of the actual sync point segments $Pt_1, Pt_2 \ldots Pt_M$ along the test signal.

In accordance with block 1010, a first of several sync point segment frequencies $f_t$ is selected. In accordance with a preferred embodiment of the present invention, the several sync point segment frequencies cover a range of frequencies that includes the sync pulse segment frequency $f_r$. For instance, if the sync pulse segment frequency $f_r$ is equal to 8000 Hz, the several sync point segment frequencies $f_t$ may range 7950 Hz to 8050 Hz. In this instance, the sync point segment frequency $f_t$ would be initialized to a frequency of 7950 Hz at block 1010.

As shown in block 1015, a predicted location along the test signal is derived for each sync point segment $Pt_{1(pred)}$, $Pt_{2(pred)} \ldots Pt_{M(pred)}$. The predicted locations may be derived as a function of the known locations of the sync pulse segments $Pr_1, Pr_2 \ldots Pr_M$ along the reference signal, and the present sync point segment frequency $f_t$ (e.g., 7950 Hz).

Figure 11:
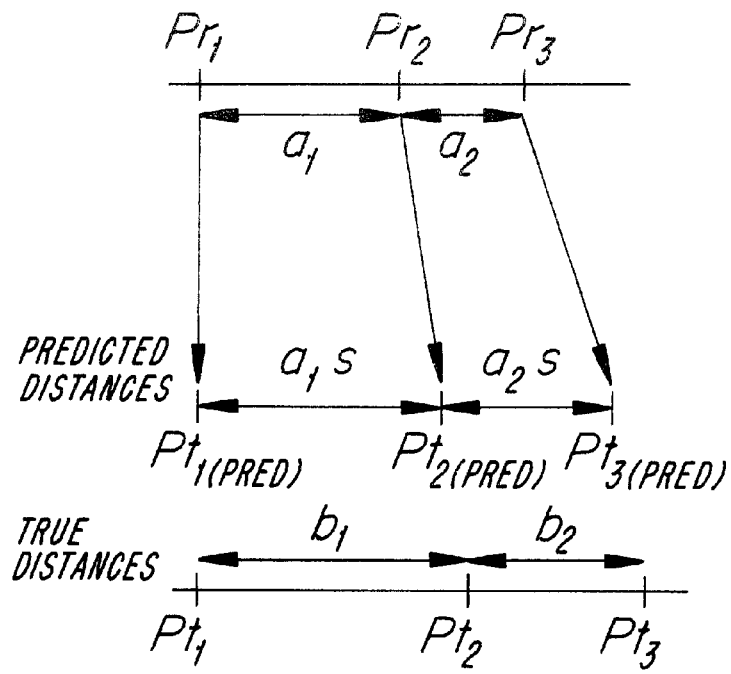
FIG. 11 illustrates an exemplary procedure for predicted the location of sync point segments along the test signal.

FIG. 11 illustrates, with greater clarity, an exemplary procedure for deriving the predicted locations of the sync point segments $Pt_{1(pred)}, Pt_{2(pred)} \ldots Pt_{M(pred)}$ along the test signal, based on the known locations of the sync pulse segments $Pr_1, Pr_2 \ldots Pr_M$ along the reference signal, the known distances $a_k$ between adjacent sync pulse segments along the reference signal, where k ranges from "1" to "M−1", a scaling factor s, and the present sync point segment frequency $f_t$. As shown in FIG. 11, the predicted location for any sync point segment, for example, the predicted location for sync point segment $Pt_{k+1}$, may be determined in accordance with the following relationship:

$$Pt_{k+1(pred)} = Pt_{k(pred)} + a_k s \qquad (7)$$

where $a_k s$ represents the distance between the two adjacent, predicted sync point segments $Pt_{k(pred)}$ and $Pt_{k+1(pred)}$, $a_k$ represents the known distance between the corresponding sync pulse segments $Pr_k$ and $Pr_{k+1}$, and where the value of the scaling factor s is derived by determining the scaling factor value that, when multiplied by each of the distances $a_k$, results in a sync point segment frequency that most accurately equals the present sync point segment frequency $f_t$ (e.g., 7950 Hz).

Then, in accordance with block 1020, the predicted locations of the sync point segments $Pt_{1(pred)}, Pt_{2(pred)} \ldots Pt_{M(pred)}$ are compared to the actual locations of the sync point segments $Pt_1, Pt_2 \ldots Pt_M$. More precisely, the predicted distances $a_k s$ between the predicted sync point segment locations $Pt_{1(pred)}, Pt_{2(pred)} \ldots Pt_{M(pred)}$ are compared to the distances $b_k$ between the actual sync point segment locations $Pt_1, Pt_2 \ldots Pt_M$. In doing so, a predicted location error $e_k$ may be calculated, for example, in accordance with equation (8) below.

$$e_k = |a_k s - b_k| \qquad (8)$$

Figure 12:
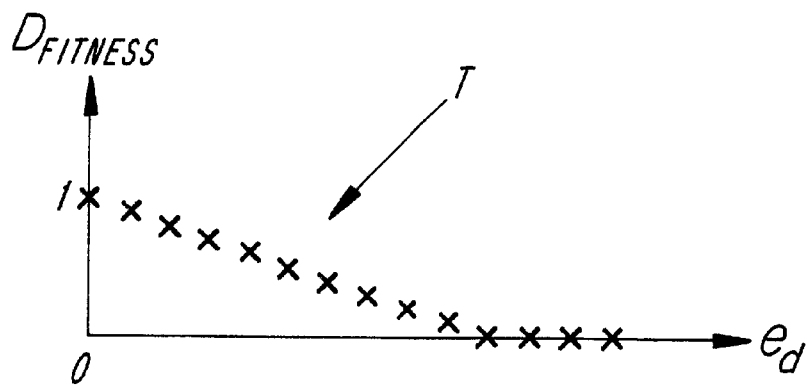
FIG. 12 depicts the transfer function T.

Then, as shown in block 1025, the fitness value $D_{fitness}$ is updated. In accordance with a preferred embodiment of the present invention, the updated fitness value $D_{fitness}$ is derived as a function of the predicted location error $e_k$, as shown below in equation (9):

$$D_{fitness} = (M-1)^{-1} \sum_{k=1}^{M-1} T(e_k) \qquad (9)$$

where T is a transfer function that causes $D_{fitness}$ to vary between a value of "0" and "1", as shown in FIG. 12, and where a fitness value equal to "1" indicates a precise match between the predicted sync point segment locations $Pt_{1(pred)}$, $Pt_{2(pred)} \ldots Pt_{M(pred)}$, and the actual sync point segment locations $Pt_1, Pt_2 \ldots Pt_M$.

As the sync point segment frequency $f_t$ is incremented during each iteration of the technique illustrated in FIG. 10, the fitness value $D_{fitness}$ will initially increase. It will peak when the sync point segment frequency $f_t$ is equal to, or approximately equal to, the sync pulse segment frequency $f_r$. Thereafter, the fitness value $D_{fitness}$ will decrease. Accordingly, the maximum fitness value $D_{fitness(max)}$ may be identified by determining when the fitness value $D_{fitness}$ peaks. This is the purpose of decision block 1030. More specifically, the updated fitness value $D_{fitness}$ is, in accordance with decision block 1030, compared to the previous fitness value, whernin a determination is made as to whether the updated fitness value is less than the previous fitness value.

If the updated fitness value $D_{fitness}$ is not less than the previous fitness value, in accordance with the "NO" path out of decision block 1030, which indicates that the previous fitness value is not the maximum fitness value, the sync point segment frequency $f_t$ is incremented, for example, from 7950 Hz to 7951 Hz, as shown in block 1035. A determination is then made as to whether all of the sync point segment frequencies, for example, all of the frequencies from 7950 Hz through 8050 Hz, have been evaluated, in accordance with decision block 1040. If, in accordance with the "NO" path out of decision block 1040, all of the sync point segment frequencies have not been evaluated, the predicted locations of the sync point segments $Pt_{1(pred)}$, $Pt_{2(pred)} \ldots Pt_{M(pred)}$ are re-calculated based on the new sync point segment frequency, which was incremented during the execution of block 1035, as stated above.

Further in accordance with the technique illustrated in FIG. 10, the procedural steps associated with blocks 1015 through 1040 are repeatedly executed until the maximum fitness value $D_{fitness(max)}$ has been identified, which occurs when an updated fitness value is less than the previous fitness value, in accordance with the "YES" path out of decision block 1030, or until the sync point segment frequency ft exceeds the maximum sync point segment frequency $f_{t(max)}$, for example, 8050 Hz, in accordance with the "YES" path out of decision block 1040. In either case, the maximum fitness value $D_{fitness(max)}$ will have been identified.

Then, in accordance with decision block 1045, a determination is made as to whether the detection flag was set equal to the "TRUE" state by the delay variation detection algorithm 905. As explained previously, the detection flag is set equal to the "TRUE" state if the delay variation detection algorithm 905 determines that the total sync point position error E is less than the total sync point position error threshold $T_E$ and the variance V is less than the variance threshold $T_V$. If the detection flag is set to the "TRUE" state, in accordance with the "YES" path out of decision block 1045, the maximum fitness value $D_{fitness(max)}$ is compared to a relatively low fitness value threshold $T_{FL}$ (e.g., 0.7). However, if the detection flag is not set to the "TRUE" state, in accordance with the "NO" path out of decision block 1045, the maximum fitness value $D_{fitness(max)}$ is compared to a relatively high fitness value threshold $T_{FH}$ (e.g., 0.9). It will be understood that the fitness value thresholds $T_{FL}$ and $T_{FH}$ may be empirically derived.

If it is determined that the maximum fitness value $D_{fitness(max)}$ is greater than the fitness value threshold $T_{FL}$ or $T_{FH}$, in accordance with the "YES" path out of decision block 950 or decision block 960, respectively, the level of continuous delay variation $\Delta f$, exhibited by the sync point segments $Pt_1$, $Pt_2 \ldots Pt_M$ along the test signal, is estimated, as shown in block 1055, as a function of the sync point segment frequency $f_t$ that corresponds with the maximum fitness value $D_{fitness(max)}$ and the sync pulse segment frequency $f_r$ as indicated in equation (3) above. If, alternatively, it is determined that the maximum fitness value $D_{fitness(max)}$ is not greater than the fitness value threshold, in accordance with the "NO" path out of decision block 1050 or decision block 1060, the continuous delay variation $\Delta f$ is set equal to zero (0), thus indicating the likelihood that no continuous variable delay is exhibited by the sync point segments $Pt_1$, $Pt_2 \ldots Pt_M$ along the test signal.

The fourth functional element associated with the decision algorithm 310 is a discontinuity estimation algorithm 720. The discontinuity estimation algorithm 720 estimates the location of a discontinuity, for example, along a given length of the test signal between two sync point segments, as well as the size of the discontinuity.

In accordance with an exemplary embodiment of the present invention, the discontinuity estimation algorithm 720 begins the process of estimating the location and size of a discontinuity by first identifying a section of the test signal which precedes a sync point segment that has been identified as a discontinuity by the outlier identification and removal algorithm 710, as described above. For example, the discontinuity estimation algorithm 310 may identify a section $A_i$ of the test signal as containing a discontinuity, where $A_i$ is bounded by sync point segments $Pt_i$ and $Ft_{i+1}$, and where the sync point segment $Pt_{i+1}$ was identified by the outlier identification and removal algorithm as being a discontinuity. Next, any continuous delay variation $\Delta f$ associated with section $A_i$, as determined by the continuous delay variation estimation algorithm 715, is removed.

Figure 13:
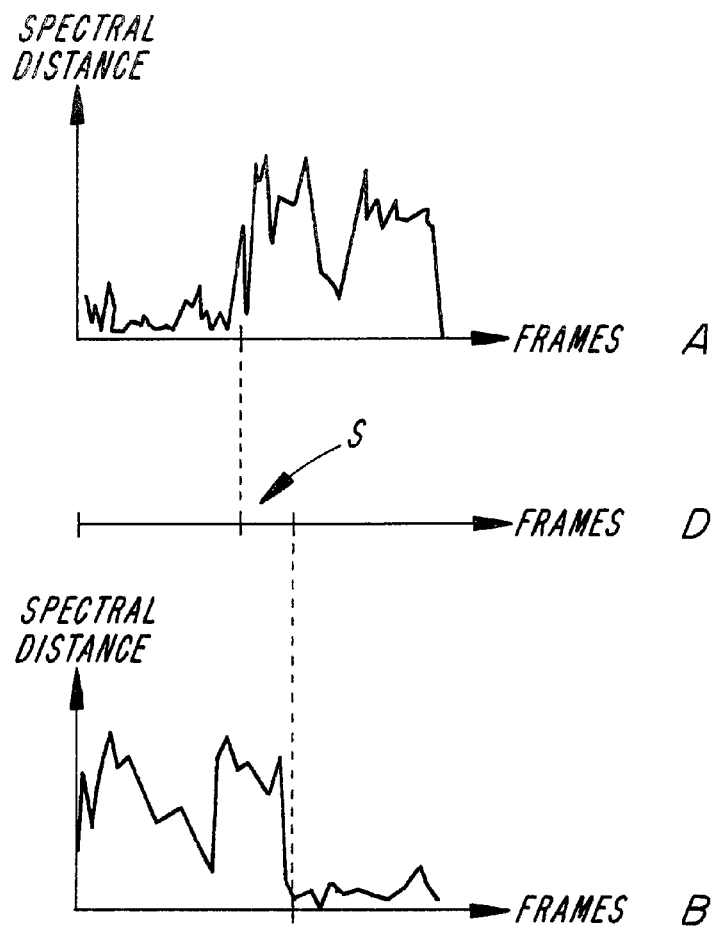
FIG. 13 shows a number of graphs which together illustrate the estimation of the location L and the size S of a signal discontinuity along a section of the test signal.
Figure 13:
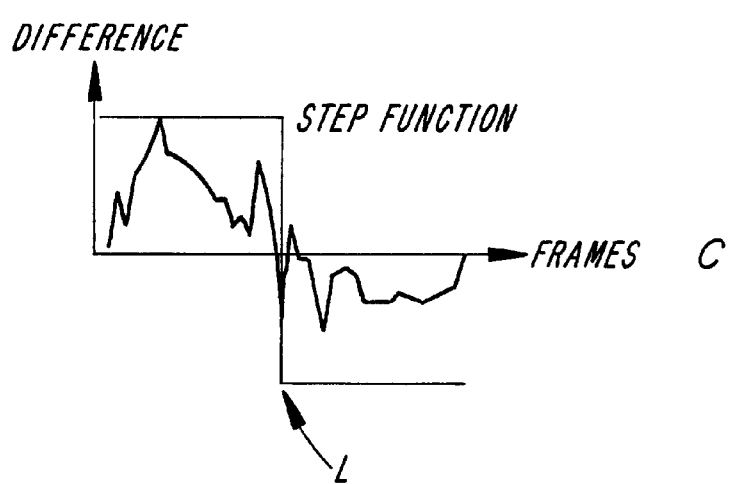

The sync point segment $Pt_i$ preceding the section $A_i$ is then aligned with the sync pulse segment $Pr_i$ preceding a corresponding section $a_i$ in the reference signal, and a special distance between the section $A_i$ of the test signal and the section $a_i$ of the reference signal is generated. FIG. 13 shows a graph A which represents the spectral distance between a section $A_i$ of a test signal and a corresponding section $a_i$ of a reference signal, where the two sections $A_i$ and $a_i$ have been aligned as described above. It is of particular importance to note that the spectral distance is initially small, as section $A_i$ of the test signal and section $a_i$ of the reference signal are synchronized at this point. Then, the spectral distance undergoes a transition from relatively small values to relatively large values, as shown, where this transition coincides with the onset of a discontinuity. The spectral distance increases at this point because section $A_i$ of the test signal and section $a_i$ of the reference signal are no longer synchronized, due to the presence of the discontinuity.

The sync point segment $Pt_{i+1}$ following section $A_i$ is then aligned with the sync pulse segment $Pr_{i+1}$ that follow the corresponding section $a_i$, and the spectral distance between section $A_i$ of the test signal and section $a_i$ of the reference signal is once again generated. FIG. 13 also shows a graph B, where graph B represents the spectral distance, between a section $A_i$ of a test signal and a corresponding section $a_i$ of a reference signal, where the two sections $A_i$ and $a_i$ have been aligned with respect to sync: point segment $Pt_{i+1}$ and sync pulse segment $Pr_{i+1}$. In contrast with graph A, the spectral distance values in graph B are initially large, as section $A_i$ of the test signal and section $a_i$ of the reference signal are not yet synchronized due to the presence of the discontinuity and due to the fact that the section $A_i$ of the test signal and section $a_i$ of the reference signal are aligned with respect to sync point segment $Pt_{i+1}$ and sync pulse segment $Pr_{i+1}$. Then, the spectral distance undergoes a transition to a relatively small value, as shown, where the transition in this instance coincides with the end of the discontinuity. The spectral distance then remains at a relatively small value because section $A_i$ of the test signal and section $a_i$ of the reference signal are now synchronized.

The Discontinuity Estimation algorithm 720 may then determine the estimated location L of the discontinuity along section $A_i$ of the test signal, for example, in terms of a number of data frames, by calculating the difference between the spectral distance values associated with graph A and the spectral distance values associated with graph B, as shown in FIG. 13, graph C. The resulting difference should resemble a step function, as indicated, wherein a region close to a zero cross-over point represents the estimated location L of the discontinuity along section $A_i$ of the test signal.

The Discontinuity Estimation algorithm 720 may also determine the estimated size S of the discontinuity along section $A_i$, for example, in terms of a number of data frames, by calculating the number of frames between the onset of the discontinuity, as shown in graph A, and the end of the discontinuity, as shown in graph B. The size S of the discontinuity is illustrated in FIG. 13, graph D.

Figure 14:
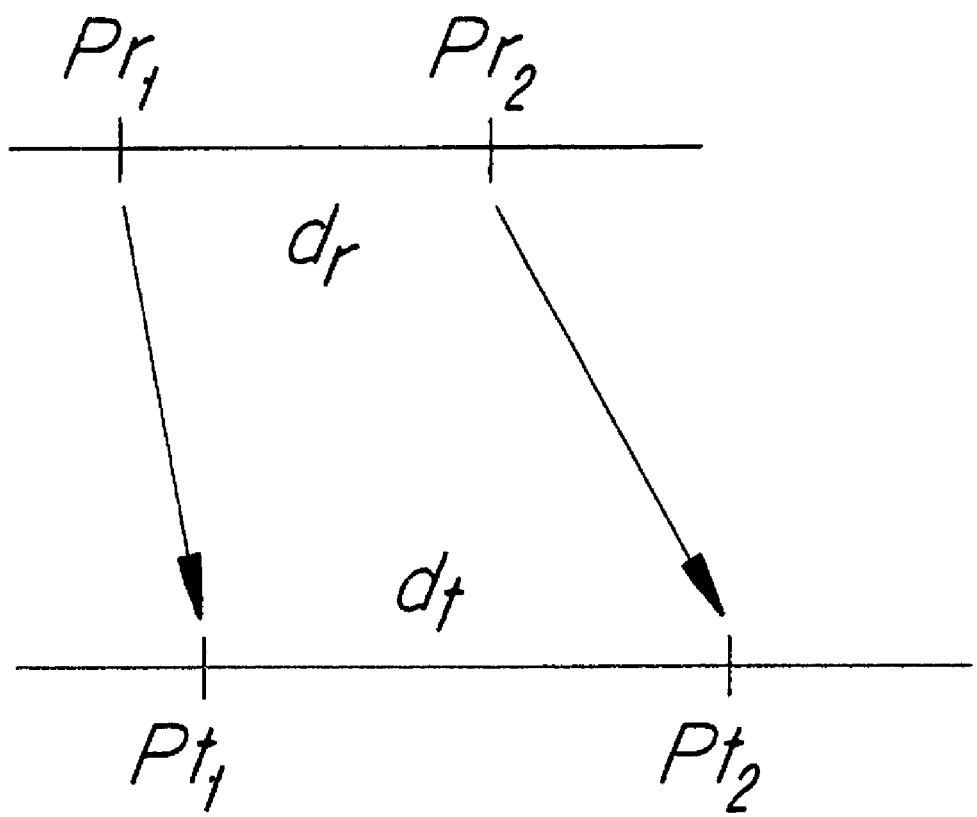
FIG. 14 illustrates an exemplary technique for calculating the size S of the signal discontinuity.

FIG. 14 illustrates, in greater detail, a technique that may be used to calculate the size S of the discontinuity illustrated in FIG. 13, graph D. In FIG. 14, a discontinuity exists between sync point segments $Pt_1$ and $Pt_2$. The length S of the discontinuity, which may be represented by a number of samples, can be calculated by determining the difference between the length $d_t$, along the test signal, and the length $d_r$, along the reference signal. Of course, the length S should be adjusted to compensate for any continuous variable delay.

The Discontinuity Estimation algorithm 720, of course, may estimate the location L and the size S of each discontinuity. Accordingly, the output of the Discontinuity Estimation algorithm 720 is a vector $\{(L_1,S_1); (L_2,S_2) \ldots \}$, where each vector element contains a discontinuity location L and a discontinuity size S.

As stated above, the pre-processing module 315 adjusts the reference and/or test signals so that they are similarly scaled in the time domain. The pre-processing module 315 accomplishes this by removing from the test signal and/or the reference signal, any portion thereof that corresponds with an intermittent delay (i.e., a discontinuity). Of course, the pre-processing module 315 bases the removal of certain portions of the test and/or reference signals, which correspond with an intermittent delay, on the vector information $\{(L_1,S_1); (L_2,S_2) \ldots \}$ produced by the Decision algorithm 310, and more particularly, the Discontinuity Estimation algorithm 720. Furthermore, the pre-processing module 315 eliminates from ttie test and/or reference signals any continuous delay variations $\Delta f$, where the continuous delay variation $\Delta f$ is derived by the Continuous Delay Variation Estimation algorithm 715. A standard speech quality estimation algorithm 320 may then be employed to derive an accurate speech quality estimate based on the adjusted reference and/or test signals.

The Score Adjustment algorithm 325 generates a measure of perceived speech quality. The Score Adjustment algorithm 325 generates this perceived speech quality measure by adjusting the speech quality estimate produced by the standard speech quality estimation algorithm 320. The Score Adjustment algorithm 325 adjusts the speech quality estimate based on any one or more variables which are derived from the continuous and/or intermittent delay information generated by the Decision algorithm 310. For example, the Score Adjustment algorithm 325 may adjust the speech quality estimate based on the number of discontinuities that are identified, the length of any one or more of the discontinuities identified, the content of the data frames that coincide with a discontinuity, or the level of continuous variable delay.

It should be noted that the present invention has been described in accordance with exemplary embodiments, which are intended to be illustrative in all aspects, rather than restrictive. Thus, the present invention is capable of many variations in detailed implementation, which may be derived from the description contained herein by a person or ordinary skill in the art. All such variations are considered to be within the scope and spirit of the present invention as defined by the following claims.

What is claimed is:

1. In a telecommunications network, wherein a first speech signal is transported across a transmission chain to a receiving entity, a method for estimating speech quality comprising the steps of:

at the receiving entity, aligning each of a number of synchronization points along the first speech signal with a corresponding one of a number of synchronization points along a reference speech signal;

determining whether any portions of the first speech signal reflect an intermittent delay variation, based on said alignment of the synchronization points along the first speech signal and the synchronization points along the reference speech signal;

determining a level of continuous delay variation exhibited by the first speech signal;

adjusting the first speech signal or the reference speech signal to account for the level of continuous delay variation exhibited by the first speech signal and for any portions of the first speech signal that reflect an intermittent delay variation;

comparing the first speech signal to the reference speech signal; and estimating speech quality based on said comparison of the first speech signal to the reference speech signal.

2. The method of claim 1 further comprising the step of: adjusting the estimated speech quality based on said level of continuous delay variation.

3. The method of claim 1 further comprising the steps of: analyzing portions of the first speech signal that reflect an intermittent delay variation; and adjusting the estimated speech quality based on said analysis of those portions of the first speech signal that reflect an intermittent delay variation.

4. The methods of claim 3, wherein said step of analyzing portions of the first speech signal that reflect an intermittent delay variation comprises the step of:

determining, the number of portions of the first speech signal that reflect an intermittent delay variation.

5. The method of claim 3, wherein said step of analyzing portions of the first speech signal that reflect an intermittent delay variation comprises the step of:

determining the length of those portions of the first speech signal that reflect an intermittent delay variation.

6. The method of claim 3, wherein said step of analyzing portions of the first speech signal that reflect an intermittent delay variation comprises the step of:

determining the speech content of those portions of the first speech signal that reflect an intermittent delay variation.

7. The method of claim 1, wherein the first speech signal is a test signal, and wherein the first speech signal, prior to transmission, is identical to the reference speech signal.

8. In a packet switched telecommunications network, wherein speech signals are transported across a transmission chain to a receiving entity, a method for estimating speech quality comprising the steps of:

aligning each of a number of sync point segments along a first speech signal with a corresponding sync pulse segment along a reference speech signal, wherein the first speech signal was transported across the transmission chain to the receiving entity, and wherein the reference signal is identical to the first speech signal prior to the First speech signal having been transported across the transmission chain;

identifying whether an intermittent delay variation exists between adjacent sync point segments along the first speech signal;

determining a location and size of any identified intermittent delay variation along the first speech signal;

determining, a level of continuous delay variation exhibited by the first speech signal;

adjusting the first speech signal or the reference speech signal to account for the presence of any intermittent delay variations and the level of continuous delay variation along the first speech signal;

comparing the first speech signal to the reference signal after the first speech signal or the reference speech signal has been adjusted;

estimating speech quality based on said comparison of the first speech signal and the reference signal; and adjusting the estimated speech quality to achieve a perceived speech quality, wherein said adjustment of the estimated speech quality is based on the intermittent delay variations, if any, and the level of continuous delay variation.

9. The method of claim 8, wherein said step of identifying whether an intermittent delay variation exists between adjacent sync point segments along the first speech signal comprises the steps of:

quantifying the length of the first speech signal between each pair of adjacent sync point segments;

determining whether the length of the first speech signal between any pair of adjacent sync point segments is abnormal; and establishing that an intermittent delay variation is present along the first speech signal, between two adjacent sync point segments, if it is determined that the length between the two adjacent sync point segments is abnormal.

10. The method of claim 9, wherein said step of determining whether the length of the first speech signal between any pair of adjacent sync point segments is abnormal comprises the steps of:

determining the difference between the length of the first speech signal between each pair of adjacent sync point segments and the length of the reference speech signal between each corresponding pair of adjacent sync pulse segments; and comparing each difference value to a threshold value.

11. The method of claim 10, wherein the threshold value is based on a weighted median of the difference values.

12. The method of claim 10, wherein the threshold value is empirically derived.

13. The method of claim 8, wherein said step of determining a location and size of any identified intermittent delay variation along the first speech signal comprises the steps of:

aligning a length of the first speech signal between two adjacent sync point segments, that has been identified as exhibiting an intermittent delay, with a length along the reference signal between two corresponding adjacent sync pulse segments, where in aligning the length of the first speech signal between the two adjacent sync point segments and the length of the reference speech signal between the two corresponding sync pulse segments, a first one of the two adjacent sync point segments is aligned with a corresponding one of the two sync pulse segments;

deriving a first series of spectral distance values based on the alignment of the length of the first speech signal and the length along the reference signal;

re-aligning the length of the first speech signal between the two adjacent sync point segments with the length along the reference signal between the two corresponding sync pulse segments, where in re-aligning the length of the first speech signal between the two adjacent sync point segments and the length of the reference speech signal between the two corresponding sync pulse segments, a second one of the two adjacent sync point segments is aligned with a second one of the two corresponding sync pulse segments; and deriving a second series of spectral distance values based on the re-alignment of the length of the first speech signal and the length along the reference signal.

14. The method of claim 13, wherein said step of determining the location and size of any identified intermittent delay variation along the first speech signal further comprises the steps of:

comparing the first series of spectral distance values with the second series of spectral distance values; and measuring a distance between a transition associated with the first series of spectral distance values and a transition associated with the second series of spectral distance values, wherein the measured distance represents the size of a corresponding intermittent delay variation.

15. The method of claim 13, wherein said step of determining the location and size of any identified intermittent delay variation along the first speech signal further comprises the steps of:

deriving a series of difference values by calculating the difference between each of the values associated with the first series of spectral distance values and a corresponding one of the values associated with the second series of spectral distance values; and determining the location of a corresponding intermittent delay variation based on a transition associated with the series of difference values.

16. The method of claim 8, wherein said step of determining the level of continuous delay variation exhibited by the first speech signal comprises the steps of:

selecting a number of sync point frequencies associated with the sync point segments along the first speech signal, wherein said selected number of sync point frequencies include frequencies that are less than a sync pulse frequency associated with the sync pulse segments along the reference signal and frequencies that are greater than the sync pulse frequency;

for each of the selected sync point frequencies, predicting a location for each sync point segment along the first speech signal, as a function of the selected sync point frequency and known locations of the sync pulse segments along the reference signal;

for each of the selected sync point frequencies, comparing the predicted location of each sync point segment along the first speech signal with an actual location of the sync point segment along the first speech signal;

for each of the selected sync point frequencies, deriving a fitness value, wherein said fitness value is based on an amount of position error between the predicted location of each sync point segment and the actual location of the sync point segment;

identifying a maximum fitness value from amongst the fitness values derived for each of the selected sync point frequencies;

determining whether the maximum fitness value exceeds a threshold value; and determining the level of continuous delay variation as a function of the selected sync point frequency that corresponds with the maximum fitness value and the sync pulse frequency.

17. The method of claim 16 further comprising the step of:
determining the level of continuous delay variation to be zero if the maximum fitness value does not exceed the threshold value.

18. The method of claim 16 further comprising the step of:
prior to selecting the number of sync point frequencies, determining whether it is more likely than not that the first speech signal exhibits a continuous delay variation.

19. The method of claim 18, wherein said step of determining whether the maximum fitness value exceeds the threshold value comprises the step of:

comparing the maximum fitness value to a first threshold value if it is determined that the first speech signal is, more likely than not, exhibiting a continuous delay variation, and to a second threshold value if it is determined that the first speech signal is less likely to be exhibiting a continuous delay variation, where the first threshold value is less than the second threshold value.

20. The method of claim 8 further comprising the step of:
identifying a number of sync point segments, each of which follow a length along the first speech signal that, more likely than not, reflects an intermittent delay variation.

21. The method of claim 20, wherein said step of determining the level of continuous delay variation exhibited by the first speech signal is based on a location of each sync point segment along the first speech signal, excluding those sync point segments that are identified as following a length along the first speech signal that, more likely than not, reflects an intermittent delay variation.

22. The method of claim 8, wherein said step of adjusting the estimated speech quality to achieve a perceived speech quality comprises the steps of:

determining the number of intermittent delay variations that are exhibited by the first speech signal; and adjusting the estimated speech quality as a function of the number of intermittent delay variations that are exhibited by the first speech signal.

23. The method of claim 8 wherein said step of adjusting the estimated speech quality to achieve a perceived speech quality comprises the step of:

adjusting the estimated speech quality as a function of the size of each intermittent delay variation.

24. The method of claim 8, wherein said step of adjusting the estimated speech quality to achieve a perceived speech quality comprises the step of:

adjusting the estimated speech quality as a function of the speech content associated with each delay variation.

25. The method of claim 8, wherein said step of adjusting the estimated speech quality to achieve a perceived speech quality comprises the step of:

adjusting the estimated speech quality as a function of a degree and type of continuous delay variation.

26. The method of claim 8, wherein said step of adjusting the first speech signal or the reference speech signal to account for the presence of any intermittent delay variations and the level of continuous delay variation along the first speech signal comprises the step of:

scaling the first speech signal or the reference speech signal such that the first speech signal and the reference speech signal are similarly scaled in the time domain.

* * * * *